US012134926B2

(12) United States Patent
Hirtsiefer

(10) Patent No.: US 12,134,926 B2
(45) Date of Patent: Nov. 5, 2024

(54) CONTROL ARM HAVING ADJUSTABLE LENGTH

(71) Applicant: Samet Kalip Ve Maden Esya San. Ve Tic. A.S., Istanbul (TR)

(72) Inventor: Artur Hirtsiefer, Neunkirchen-Seelscheid (DE)

(73) Assignee: Samet Kalip Ve Madeni Esya San. Ve Tic. A.S., Istanbul (TR)

( * ) Notice: Subject to any disclaimer, the term of this patent is extended or adjusted under 35 U.S.C. 154(b) by 1342 days.

(21) Appl. No.: 16/606,874

(22) PCT Filed: May 15, 2017

(86) PCT No.: PCT/TR2017/000058
§ 371 (c)(1),
(2) Date: Oct. 21, 2019

(87) PCT Pub. No.: WO2018/212724
PCT Pub. Date: Nov. 22, 2018

(65) Prior Publication Data

US 2020/0131825 A1 Apr. 30, 2020

(51) Int. Cl.
*E05F 1/10* (2006.01)

(52) U.S. Cl.
CPC ....... *E05F 1/1058* (2013.01); *E05Y 2201/624* (2013.01); *E05Y 2900/20* (2013.01)

(58) Field of Classification Search
CPC ............................ E05F 1/1058; E05F 1/1075; E05Y 2201/624; E05Y 2900/20; E05Y 2201/626;

(Continued)

(56) References Cited

U.S. PATENT DOCUMENTS 2,960,718 A * 11/1960 Lasier ....................... E05F 3/00 403/150
4,564,973 A 1/1986 Kordes
(Continued)

FOREIGN PATENT DOCUMENTS

DE 7605916 U1 7/1976
DE 19612922 A1 10/1997
(Continued)

OTHER PUBLICATIONS

English (machine) translation of DE7605916 (Year: 1976).*
(Continued)

*Primary Examiner* — Hiwot E Tefera
(74) *Attorney, Agent, or Firm* — Lucian Wayne Beavers; Patterson Intellectual Property Law, PC

(57) ABSTRACT

The invention relates to a control arm for joining a flap holder to a flap, folding flap, door, or the like in an articulated manner, the control arm including at least one first and one second telescoping arm displaceably guided thereon for adjusting the length thereof, and the control arm including at least one fixing device for fixing the position of the two telescoping arms relative to each other. It is thereby provided that a detent connection acting between the telescoping arms in the direction of the change in length thereof is associated with the control arm and includes at least two detent settings disposed along the change in length of the control arm and spaced apart by a detent spacing.

Figure 1:
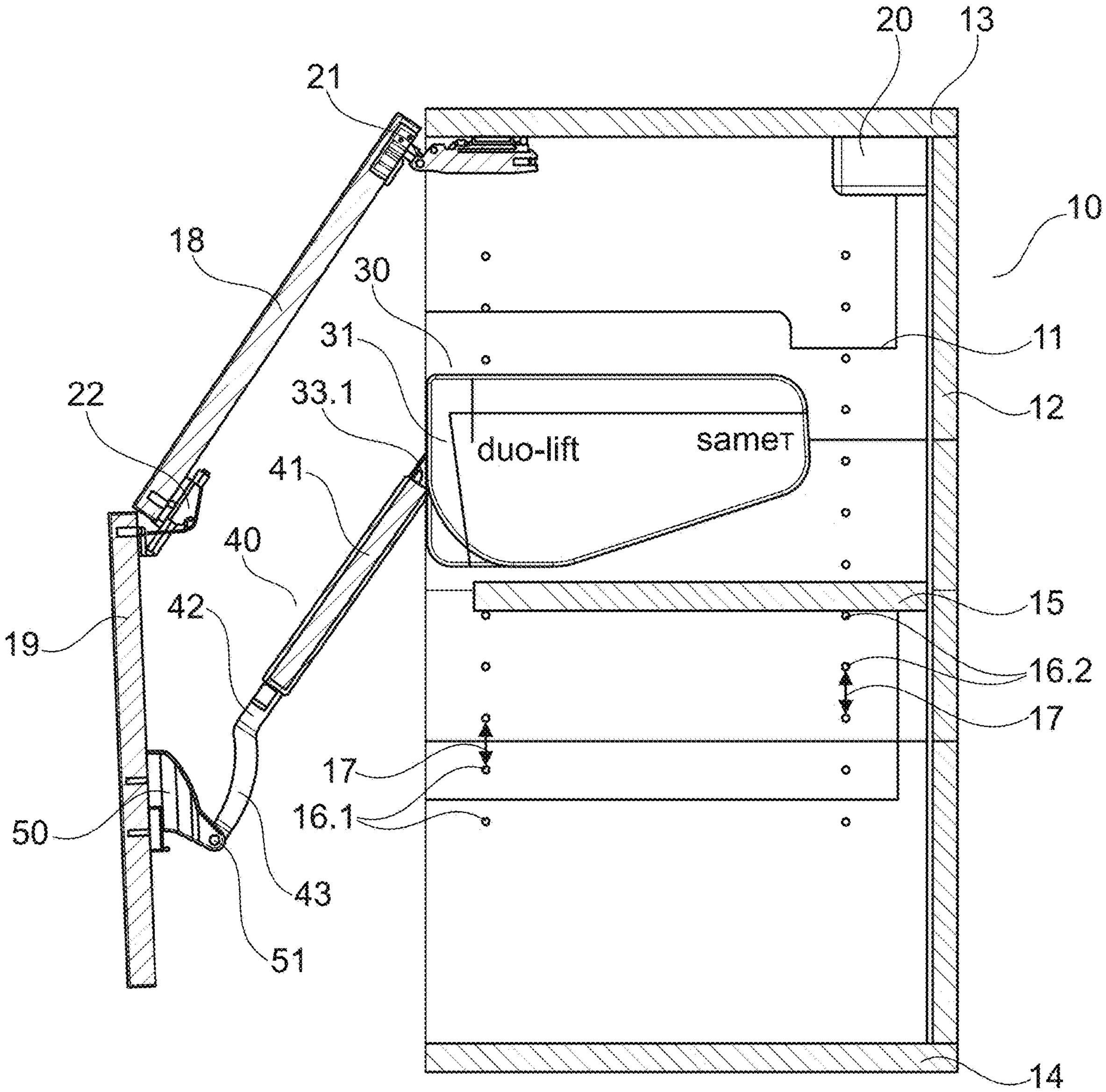

The invention further relates to a lifting device having such a control arm and a method for adjusting the length of such a control arm.

The length of the control arm can be easily and quickly adjusted to the particular flap, folding flap, door, or the like.

17 Claims, 8 Drawing Sheets

(58) Field of Classification Search

CPC ........... E05Y 2600/53; E05Y 2800/372; E05Y 2900/132; E05Y 2800/37; E05Y 2600/33; E05D 15/262; Y10T 403/32426

See application file for complete search history.

(56) References Cited

U.S. PATENT DOCUMENTS

| | | | | | |
|---|---|---|---|---|---|
| 4,703,539 | A * | 11/1987 | Lautenschlager, Jr. | E05D 7/0407 | 16/382 |
| 5,217,267 | A * | 6/1993 | Yagi | E05C 17/085 | 217/60 F |
| 5,381,628 | A * | 1/1995 | D'Hooge | E05C 17/30 | 16/49 |
| 7,694,459 | B2 * | 4/2010 | Brunnmayr | E05D 15/46 | 49/356 |
| 7,971,944 | B2 * | 7/2011 | Sagel | A47B 88/42 | 312/270.3 |
| 9,267,316 | B2 * | 2/2016 | Ding | E05F 1/105 | |
| 10,240,375 | B2 * | 3/2019 | Brunnmayr | E05F 1/1246 | |
| 10,392,842 | B1 * | 8/2019 | Yu | E05D 7/081 | |
| 11,299,922 | B2 * | 4/2022 | Oakley | E05F 3/227 | |
| 2003/0215283 | A1 * | 11/2003 | Hsieh | F16B 7/105 | 403/109.2 |
| 2007/0209157 | A1 | 9/2007 | Kung | | |
| 2007/0257538 | A1 | 11/2007 | Brunnmayr | | |
| 2009/0072551 | A1 * | 3/2009 | Hirtsiefer | E05D 15/46 | 292/196 |
| 2016/0168896 | A1 * | 6/2016 | Holzapfel | E05D 15/401 | 16/327 |
| 2017/0218675 | A1 * | 8/2017 | Cooper | E05D 7/0415 | |
| 2019/0368254 | A1 * | 12/2019 | Xu | E05D 15/40 | |
| 2020/0132112 | A1 * | 4/2020 | Hirtsiefer | F16C 17/02 | |

FOREIGN PATENT DOCUMENTS

| | | | | |
|---|---|---|---|---|
| DE | 202006020216 | U1 | 1/2008 | |
| DE | 102007021656 | A1 | 11/2008 | |
| DE | 202010015092 | U1 * | 3/2012 | E05D 15/262 |
| DE | 202014102477 | U1 | 10/2015 | |
| EP | 107151 | A1 | 5/1984 | |
| EP | 0349025 | A1 * | 1/1990 | E05D 7/04 |
| EP | 1812674 | A1 | 8/2007 | |
| EP | 2857620 | A1 | 4/2015 | |
| GB | 478117 | A | 1/1938 | |
| WO | WO-8910460 | A * | 11/1989 | E04D 13/0357 |
| WO | 2006039729 | A1 | 4/2006 | |

OTHER PUBLICATIONS

English (machine) translation of DE202014102477 (Year: 2015).*

English translation of EP2949847 (Year: 2015).*

International Search Report for PCT/TR2017/000058, dated Feb. 5, 2018, 14 pages (not prior art).

Co-pending U.S. Appl. No. 16/606,870, filed May 15, 2017, 35 pages (not prior art).

European Patent Office Search Report for corresponding patent application No. 17780909.2, dated Nov. 24, 2020, 7 pages (not prior art).

* cited by examiner

CONTROL ARM HAVING ADJUSTABLE LENGTH

The invention relates to a control arm for joining a flap holder to a flap, folding flap, door, or the like in an articulated manner, the control arm comprising at least one first and one second telescoping arm displaceably guided thereon for adjusting the length thereof, and the control arm comprising at least one fixing device for fixing the position of the two telescoping arms relative to each other.

The invention further relates to a lifting device for a flap, folding flap, door, or the like, having a flap holder, a flap bearing for attaching to the flap, folding flap, door, or the like, and a control arm adjustable in length connecting the flap holder and the flap bearing, the control arm comprising at least one fixing device for fixing the adjusted length thereof.

The invention further relates to a method for adjusting the length of a control arm of a lifting device for a flap, folding flap, door, or the like of an item of furniture, the control arm producing a pivotable connection between a flap holder attached to a furniture frame and a flap bearing attached to the flap, folding flap, door, or the like, the control arm comprising at least one first and one second telescoping arm displaceably guided thereon for adjusting the length thereof, and the control arm comprising at least one fixing device for fixing the position of the two telescoping arms relative to each other.

An actuating arm for a furniture flap is known from DE 20 2006 020 216 U1. The actuating arm connects a base body mounted on an item of furniture to the furniture flap and serves for displacing the furniture flap. Said arm comprises an inner and an outer tube part telescopically displaceably supported relative to each other. This allows continuous length adjustment of the actuating arm, so that said arm can be adapted to different cabinet sizes. After setting the correct length, the two tube parts are fixed to each other in a force fit by means of a fixing device. To this end, a clamping element having a tab is disposed between the tube parts, on which an eccentric protrusion of a pivotably supported actuating element (clamp lever) acts. By actuating the clamp lever, the tab is deformed toward the inner tube part and the inner tube part is thereby spread open, so that the tube parts are prevented from displacing relative to each other. It is disadvantageous that the tube parts spread apart relative to each other, particularly for heavy furniture flaps, can be displaced relative to each other unintentionally, whereby as a result it is no longer possible to close the furniture flap completely. In order to avoid unintentional displacement of the tube parts not fixed to each other during the adjusting process, an additional guide element having spring-loaded friction pads disposed thereon is necessary. Said pads form a friction lock between the two tube parts, bringing about a certain resistance to displacement. An additional component, the guide element, is required in order to achieve the desired function of the actuating arm.

EP 1 812 674 B1 describes a spring-loaded actuator drive for displacing a flap of an item of furniture. The actuator drive comprises a base body for mounting on a furniture frame. Said drive is connected to the furniture flap by means of an actuating arm. The actuating arm can be implemented having adjustable length according to the teaching from DE 20 2006 020 216 U1. A pivotably supported detent part on which the actuating arm is fixed by a detent connection is associated with the actuator drive. This enables simple and fast installation or removal or the actuator arm. The actuating arm disadvantageously comprises a complex detent assembly for fixing to the pivotably support detent part, whereby the manufacturing costs for the actuating arm increase significantly.

The object of the invention is to provide a control arm for connecting a flap holder to a flap, folding flap, door, or the like in an articulated manner, the length thereof being simply and quickly adaptable to a particular flap, folding flap, door, or the like and secured against unintentional displacement.

A further object of the invention is to provide a lifting device having such a control arm.

Another further object of the invention is to provide a method for adjusting the length of such a control arm.

The object of the invention relating to the control arm is achieved in that a detent connection acting between the telescoping arms in the direction of the change in length thereof is associated with the control arm and comprises at least two detent settings disposed along the change in length of the control arm and spaced apart by a detent spacing. When the fixing device is released, the control arm according to the invention automatically assumes the optimal length thereof when the flap, folding flap, door, or the like is closed. The arm then detents in one of the detent settings. The effective detent connection retains said length when opening the flap, folding flap, door, or the like. To this end, the force required to overcome the detent connection is set to be greater than the force transmitted to the control arm by the flap, folding flap, door, or the like in the direction of potential length adjustment. The position of the two telescoping arms relative to each other can be fixed by means of the fixing device when the flap, folding flap, door, or the like is open. Due to the open flap, folding flap, door, or the like, the fixing device is easily accessible and can thus be actuated simply. The control arm according to the invention enables correct setting of the length thereof after closing the flap, folding flap, door, or the like once.

The time required for setting the length can thus be significantly reduced. Particularly when using two flap holders, for example at opposite sides of the flap, folding flap, door, or the like, the length thereof can be set at the same time by closing the flap, folding flap, door, or the like, and fixed after opening the flap, folding flap, door, or the like. The effort required for assembling an item of furniture having flap holders having such a control arm is thus very low.

A defined length adjustment of the control arm can be achieved in that successive detent settings are disposed at identical detent spacing to each other.

According to a particularly preferred embodiment variant of the invention, it can be provided that the detent spacing is at a whole-number ratio to the spacing of potential installed positions of the flap holder on an item of furniture, preferably that the detent spacing is at a whole-number ratio to 32 mm, particularly preferred that the detent spacing is 8 mm. The correct length of the control arm is determined when the flap, folding flap, door, or the like is closed, as said component can be completely closed only if the control arm has the correct length. When the flap, folding flap, door, or the like is closed, the control arm is oriented along the arrangement of the potential installed positions of the flap holder. The flap holder is thereby fixed at wall holes identically spaced apart from each other on the frame of the item of furniture. Said wall holes are used, for example, for mounting shelves. The spacing thereof is standardized and is at least 32 mm. Due to a detent spacing at a whole-number ratio to the spacing of the potential installed positions of the flap holder, the length of the control arm can be precisely adjusted to the present size of the item of furniture, the flap, folding flap, door, or the like or the installed position of the flap holder on the item of furniture, despite the discontinuous adjustment potential. Complete closing of the flap, folding flap, door, or the like is thereby made possible.

The detent connection between the telescoping arms can be produced simply in that detent receptacles in which a spring-loaded detent element engages are disposed on at least one of the telescoping arms.

The length of the control arm can be fixed in a simple manner in that the fixing device is designed for locking the detent element in a detent receptacle. The detent element previously engaged in the detent receptacle can then no longer be disengaged from the detent receptacle, even if strong tensile forces act on the control arm, whereby the length of the control arm is fixed and can no longer be displaced, even when holding heavy flaps, folding flaps, doors, or the like.

A simple and inexpensive structure of the fixing device can be achieved in that the fixing device comprises a locking element engaged with one of the detent receptacles in a first operating position and disengaged from the detent receptacle in a second operating position. The locking element engages with the same detent receptacles as are used for implementing the detent connection.

According to a preferred embodiment variant of the invention, it can be provided that the locking element is disposed spaced apart from the detent element by the detent spacing or by a whole-number multiple of the detent spacing. When the detent connection is detented, wherein the detent element engages in one of the detent receptacles, the locking element is thereby exactly aligned with a further detent receptacle and can be engaged with the same for fixing the length of the control arm.

It can be advantageously provided that the detent receptacles are disposed on one of the telescoping arms and that the locking element produces a locking connection to the other telescoping arm in both operating positions. The locking element is thus fixedly connected to both telescoping arms in the first operating position thereof. Mutual displacement of the telescoping arms is thereby prevented. In the second operating position, the locking element is connected to only one of the telescoping arms, while the connection to the detent receptacles of the other telescoping arm is eliminated. In said operating position of the locking element, the telescoping arms can be displaced relative to each other and the length of the control arm can thereby be adjusted.

If it is provided that the second telescoping arm as the inner telescoping arm is guided in the first telescoping arm as the outer telescoping arm, and that the detent receptacles are disposed on the second telescoping arm, then the detent receptacles are not visible from the outside and are protected against contamination. The detent connection is not accessible from the outside and thus cannot be released unintentionally.

A space-saving arrangement of the detent connection and/or of the fixing device can be achieved in that a groove running in the direction of the length thereof is formed in the second telescoping arm, and that the detent connection and/or the fixing device is at least partially disposed in the groove. The second telescoping arm as the inner telescoping arm is advantageously guided in the first telescoping arm as the outer telescoping arm. The groove is thus covered by the first telescoping arm at least in segments, and thus protected against contamination.

A particularly preferred variant of the invention is such that a T-nut is guided in the groove, on which T-nut the detent element and/or the locking element is disposed. The T-nut can be disposed in the region of the groove covered by the outer telescoping arm. The detent element can then produce a detent connection between the T-nut and the detent receptacles on the second telescoping arm. The locking element can engage in the detent receptacle in the first operating position thereof, whereby the T-nut is no longer adjustably connected to the second telescoping arm. When the locking element is released, the T-nut can be displaced relative to the telescoping arm, wherein the detent element engages in the successive detent receptacles and produces a releasable detent connection to each of the same. At the same time, the locking element can be connected to the first, outer telescoping arm in both operating positions (the locked and released settings), whereby the T-nut is fixedly connected to the first telescoping arm. In the second, released operating position of the locking element, the second telescoping arm can thus be displaced relative to the first telescoping arm relative to the defined raster. In the first, closed operating position of the locking element, both telescoping arms are fixed relative to each other.

A protected arrangement of the detent receptacles can be achieved in that the detent receptacles are disposed inside the groove, preferably on a groove floor. The detent connection can thus be disposed entirely inside the groove.

It can be advantageously provided that the detent element is implemented as a spring-loaded detent pin linearly displaceably guided in in a pin guide on the T-nut. The detent pin is advantageously aligned perpendicular to the direction of the length adjustment of the control arm. A detent connection between the detent pin and a detent receptacle can be produced and can have sufficiently high retaining force that said detent connection does not displace itself when opening the flap, folding flap, door, or the like. Simple adjusting of the length of the control arm is thereby made possible.

Less effort can also be achieved in that the detent element is implemented as an elastic detent protrusion having a detent head connected to the T-nut, preferably integrally connected thereto.

A simple and nevertheless effective fixing device can be achieved in that the locking element of the fixing device is implemented as a fixing screw threaded into the T-nut and is engaged on one side at a first operating thread-in depth with one of the detent receptacles on the second telescoping arm, and is disengaged from the detent receptacle in a second operating thread-in depth, and/or that the fixing screw is fixed to the first telescoping arm at both operating depths. Adjusting the length of the control arm can thus be locked by threading the fixing screw in, and can be enabled by threading the fixing screw out.

It can thereby be particularly preferably provided that the fixing screw, preferably a screw head of the fixing screw, is disposed in a locking hole on the first telescoping arm and is disposed accessibly from the outside at both operating thread-in depths. The T-nut can thus be disposed in the groove on the inner telescoping arm and covered by the outer telescoping arm. The fixing screw can be accessed by means of the locking hole. The fixing screw produces a connection to the outer telescoping arm at both operating thread-in depths by engaging in the locking hole. The fixing screw is thereby aligned with the locking hole at all length adjustments of the control arm and is accordingly accessible. For removing the control arm, the fixing screw can be threaded out of the T-nut and removed through the locking hole. The telescoping arms can now be pulled apart and separated from each other.

One potential variant of the invention can be characterized in that the T-nut comprises a screw receptacle as a through hole into which the fixing screw is threaded, and that the screw receptacle is expanded on the side of the screw head of the fixing screw to form a screw head receptacle. The fixing screw can be threaded into the through hole such that said screw protrudes out the end side thereof and engages in a detent receptacle disposed aligned therewith. Accordingly, the fixing screw can be threaded out of the screw receptacle far enough that the end of said screw no longer protrudes. The connection to the detent receptacle is thereby eliminated and the T-nut can be displaced relative to the telescoping arm supporting the detent receptacles by overcoming the detent connection. The screw head receptacle is designed for receiving a part of the screw head when the fixing screw is threaded in. The outer segment of the screw head thereby remains in the locking hole of the first telescoping arm and produces a connection thereto in an adjusting direction of the telescoping arms. The screw head receptacle advantageously enables the screw head to be flush with the outer surface of the first telescoping arm when the fixing screw is threaded in. For installing the control arm, the telescoping arms can be pushed together when the T-nut is placed in the groove and a detent connection is effective, until the screw receptacle in the T-nut for receiving the fixing screw is aligned flush with the locking hole. The fixing screw can then be threaded in through the locking hole into the screw receptacle, whereby the connection between the T-nut and the first telescoping arm is produced.

According to a potential variant of the invention, it can be provided that the fixing device comprises a locking arrangement for opening and closing and clamping the T-nut against one or both of the telescoping arms in the closed position thereof. The locking arrangement thus does not engage in the detent receptacles. This makes it possible, for example, that the detent connection is implemented between the T-nut and one or both groove side walls, while the locking arrangement acts between the groove floor and the first telescoping arm.

A simple and easily installed connection between the control arm and the flap holder can be achieved in that the first telescoping arm comprises an attachment region at the end thereof facing away from the second telescoping arm, by means of which said arm can be placed over a mounting protrusion of a pivotably supported lever of the flap holder. A defined attachment of the control arm to the flap holder is thereby achieved as a prerequisite for correctly adjusting the length of the control arm.

The object relating to the lifting device is achieved by a control arm according to the preceding description. The control arm can be simply and quickly adapted to the size of the item of furniture and the flap, folding flap, door, or the like joined thereto in an articulated manner. This enables simple and fast installation of the lifting device.

An easily installed and simultaneously strong connection between the control arm and the flap holder can be achieved in that the flap holder comprises a pivotably supported lever having a mounting protrusion onto which a first telescoping arm of the control arm can be placed, that a fixing screw is threaded into the mounting protrusion, and that the fully threaded-in fixing screw is disengaged and the partially threaded-in fixing screw is engaged with a fixing hole on the first telescoping arm. For placing the control arm on the mounting protrusion, the fixing screw is first threaded in completely. The control arm is then pushed onto the holding protrusion until the fixing hole is aligned with the fixing screw. The mounting protrusion preferably comprises a stop against which the control arm bears when in the correct position. A tool is then guided through the fixing hole to the fixing screw and said screw is threaded out far enough to be engaged with the fixing hole. The control arm is thus fixedly connected to the mounting protrusion. The attachment of the control arm to the flap holder thus obtained enables correct adjusting of the length of the control arm.

According to a particularly preferred embodiment variant of the invention, it can be provided that the head of the fixing screw comprises a stop and a fixing segment adjacent thereto, and that the stop of the fixing screw threaded partially into the mounting protrusion bears upon the telescoping arm and the fixing segment thereof engages with the fixing hole. The correct position of the fixing screw for fixing the control arm to the mounting protrusion is provided by the stop. The fixing segment is advantageously implemented protruding past the stop, such that said segment engages in the fixing hole when the stop bears upon the telescoping arm, but no longer protrudes out from said hole opposite the stop. When the control arm is fully installed, the fixing screw is advantageously flush with the outer surface in this manner.

If it is provided that the control arm is connected to the flap bearing by means of a pivot bearing, and that the flap bearing enables continuously variable linear displacing of the pivot bearing relative to a flap, folding flap, door, or the like attached thereto, then the deviations in the adjustable length of the control arm from an optimal length arising from the detent spacing can be compensated for. The linear displacement path of the pivot bearing advantageously corresponds to the detent spacing between adjacent detent increments of the control arm.

The object of the invention relating to the method is achieved in that a detent connection is effective between the telescoping arms for adjusting the length of the control arm in a detented manner according to defined, successive detent settings, that the flap, folding flap, door, or the like is closed when the fixing device is open, wherein the length of the control arm is adjusted to the required length, and the detent connection engages in one of the potential detent settings, that the flap, folding flap, door, or the like is opened, wherein the length of the control arm is retained by the effective detent connection, and that the position of the telescoping arms to each other is fixed by the fixing device when the flap, folding flap, door, or the like is open. The detent connection is thereby advantageously implemented such that the length of the control arm when the fixing device is released does not change, at least when carefully opening the flap, folding flap, door, or the like. The correct length of the control arm is thus determined by closing and then opening the flap, folding flap, door, or the like just once and then fixing by means of the fixing device when the flap, folding flap, door, or the like is open.

In order to be able to compensate for slight deviations in the adjusted length of the control from the optimal length, it can be provided that a coupling point of the control arm on the flap bearing is displaced for finely adjusting the closing position of the flap, folding flap, door, or the like.

Figure 2:
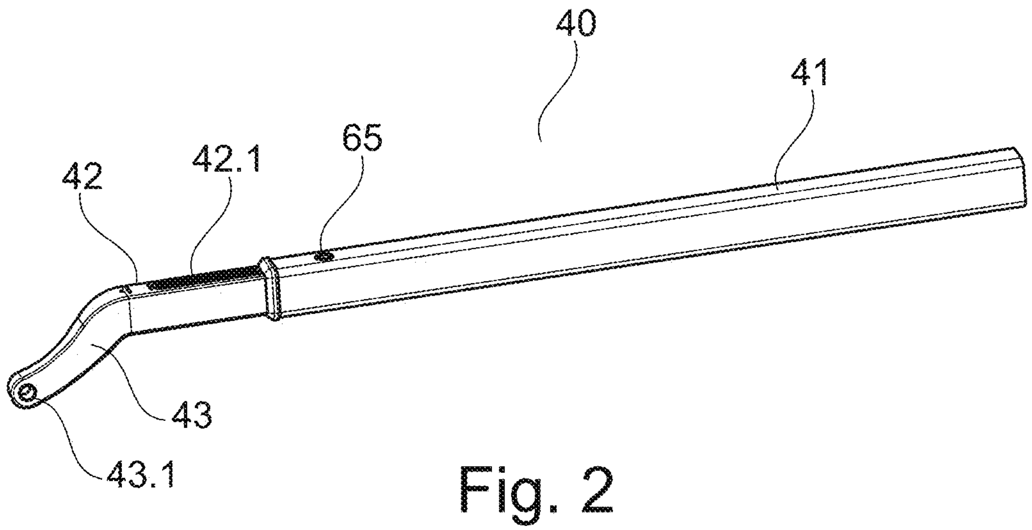
Figure 3:
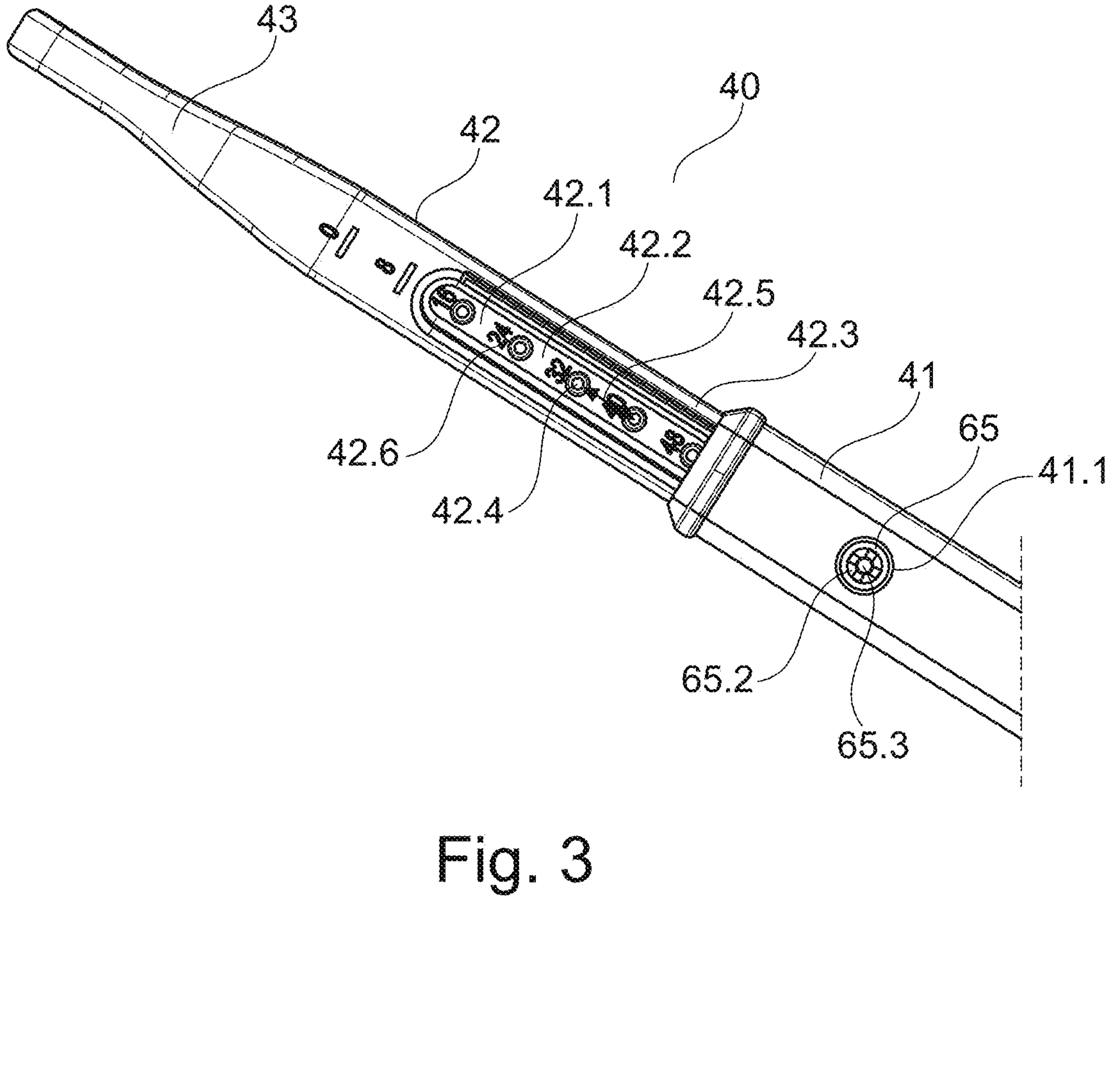
Figure 4:
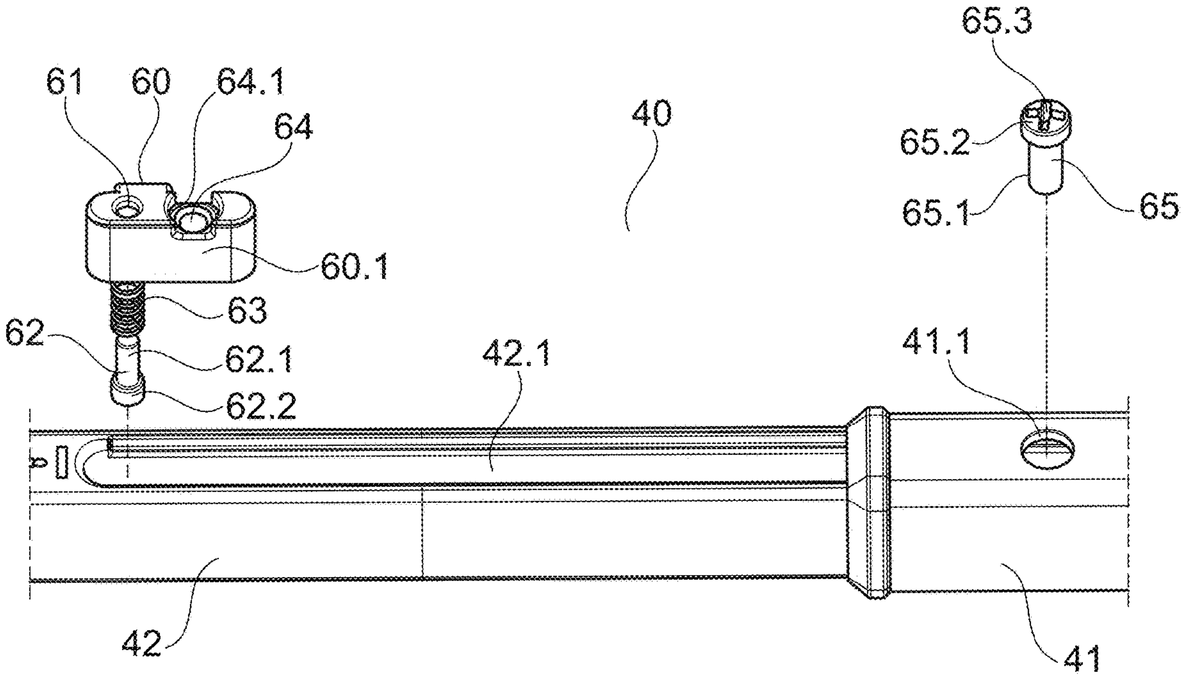
Figure 5:
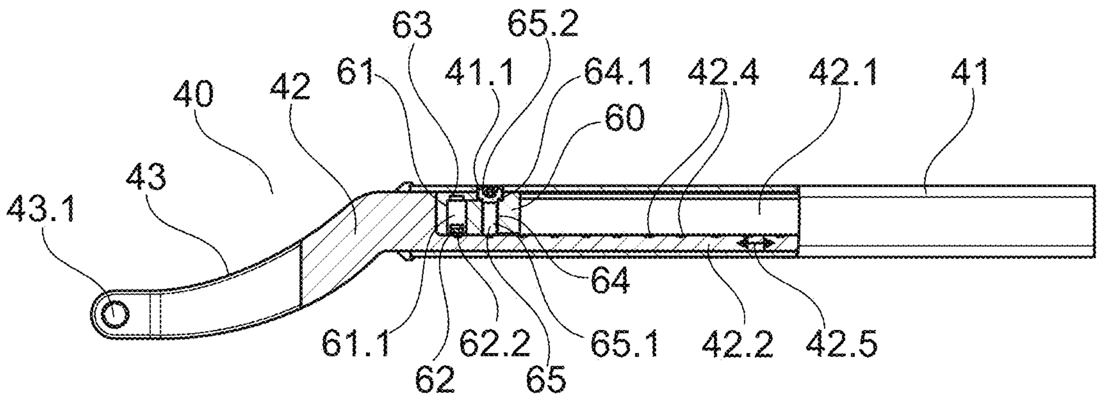
Figure 6:
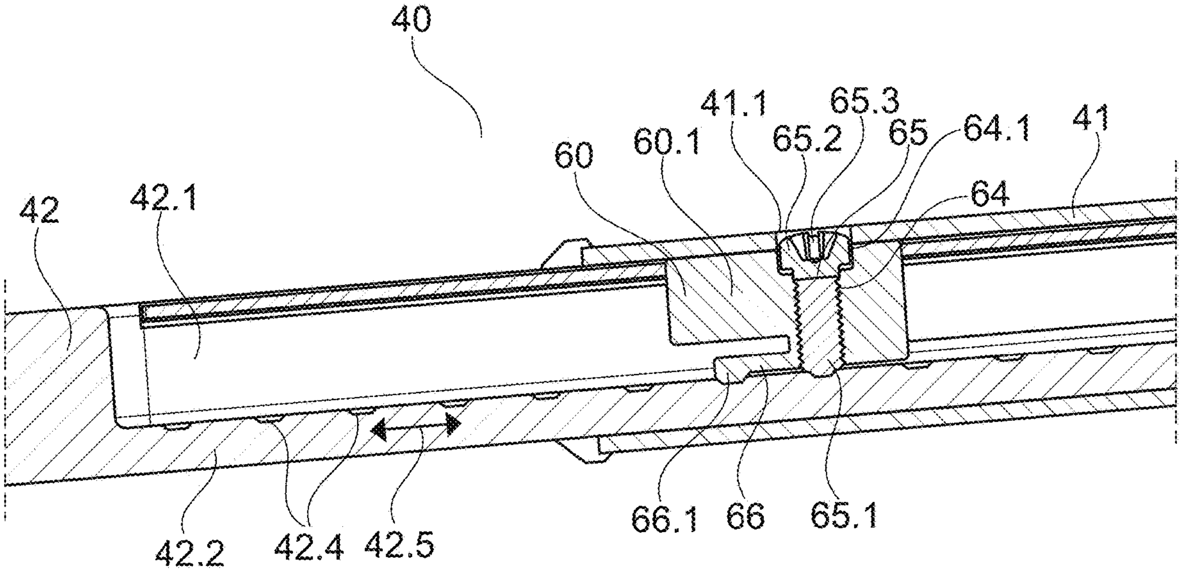
Figure 7:
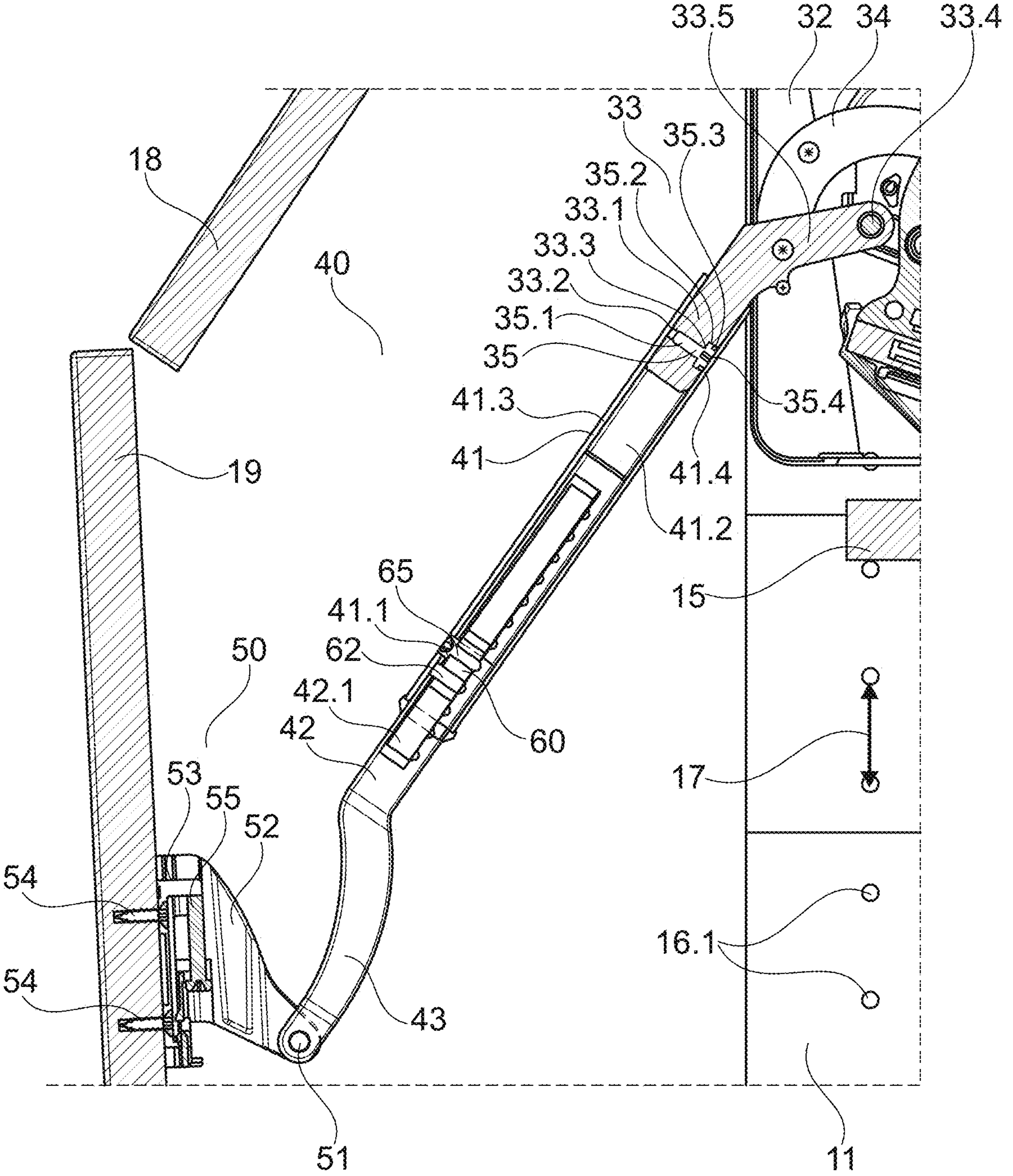
Figure 8:
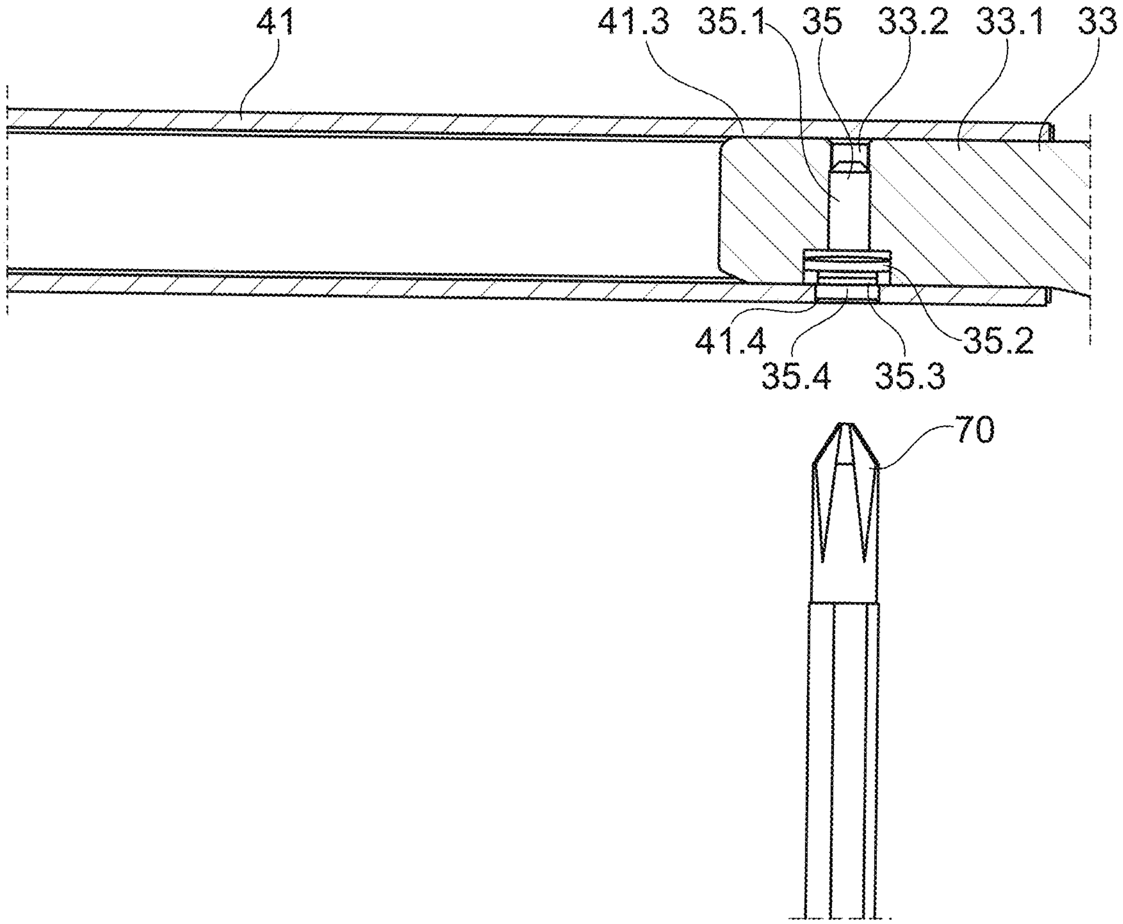

The invention is explained in greater detail below using an embodiment example shown in the drawings. They show:

FIG. 1 An item of furniture having a folding flap joined by a hinge and a lifting device having a control arm, FIG. 2 A perspective side view of the control arm, FIG. 3 A plan view of a segment of the control arm, FIG. 4 An exploded view of a segment of the control arm FIG. 5 A partial section side view of the control arm, FIG. 6 A side section view of a segment of the control arm, FIG. 7 A side section view of the item of furniture shown in FIG. 1 having the folding flap joined by a hinge, the lifting device, and the control arm, and FIG. 8 A side section view of a segment of the control arm.

FIG. 1 shows an item of furniture 10 having a folding flap joined by a hinge and a lifting device having a control arm 40. The item of furniture 10 is implemented here as a wall cupboard. The furniture frame comprises a side wall 11, a rear wall 12, a cabinet top 13, and a cabinet floor 14. A mounting element 20 for attaching the item of furniture, for example to a wall, is disposed on the side wall 11. The interior space of the item of furniture 10 is subdivided by a shelf 15. To this end, front and rear wall holes 16.1, 16.2 are made in the side wall 11 and in a second side wall of the item of furniture disposed opposite the side wall 11 and not shown. Mounting elements, not shown, on which the shelf 15 rests are disposed in one each front and rear wall hole 16.1, 16.2. The front and rear wall holes 16.1, 16.2 are spaced apart from each other at a fixed, specified hole spacing 17. The hole spacing 17 is standardized and here is 32 mm.

The item of furniture 10 can be closed by means of the folding flap shown partially opened here. The folding flap comprises a first and a second partial flap 18, 19. The two partial flaps 18, 19 are connected to each other by means of a central hinge 22. The first partial flap 18 is hinged to the furniture frame by means of a furniture hinge 21 and attached there to the cabinet top 13.

The lifting device supports the opening and closing operation of the folding flap. Said device is implemented here for holding the folding flap in position even in a partially open condition. To this end, said device comprises a flap holder 30 attached to the side wall 11 of the item of furniture 10. The flap holder 30 is fixed at at least one of the front wall holes 16.1. The installed position of the flap holder 30 can be selected depending on the size of the item of furniture 10 and the folding flap. The potential installed positions are thereby specified by the locations of the front wall holes 16.1. A housing 32 of the flap holder 30 shown in FIG. 7 is obscured by a cover 31 in the representation according to FIG. 1. A mounting protrusion 33.1 extends out of the housing 32. As can be seen further in FIG. 7, the holding protrusion 33.1 is part of a lever 33 pivotably supported on the flap holder 30. One end of the control arm 40 is connected to the mounting protrusion 33.1.

The control arm 40 comprises a first and a second telescoping arm 41, 42. The first telescoping arm 41 thereby forms an outer telescoping arm in which the second telescoping arm 42 is linearly displaceably supported as an inner telescoping arm. By sliding the second telescoping arm 42 correspondingly relative to the first telescoping arm 41, the length of the control arm 40 can be changed. The second telescoping arm 42 comprises a mounting segment 43 on the end thereof facing away from the first telescoping arm 41. The mounting segment 43 is curved in shape. At the end thereof, the mounting segment 43 is pivotably connected to a flap bearing 50 by means of a pivot bearing 51. The flap bearing 50 is attached at the inner surface of the second partial flap 19 of the folding flap.

The folding flap is pivoted about the furniture hinge 21 for opening and closing the item of furniture 10. The second partial flap 19 is thereby guided by the central hinge 22 and the lifting device. The lifting device transmits a force acting in the opening direction from the flap holder 30 to the folding flap by means of the control arm 40 and the flap bearing 50.

When opening the folding flap, the second partial flap 19 is also pivoted about the pivot axis 33.4 of the flap holder 30 shown in FIG. 7. This leads to a folding motion of the two partial flaps 18, 19 about the central hinge 22, such that said flaps are oriented at an acute angle to each other and are supported by the lifting device in the upper region of the item of furniture 10.

In the closed state, the two partial flaps 18, 19 contact the furniture frame in a plane. The control arm 40 is then disposed in the interior of the item of furniture 10 and runs to the side of the folding flap. The curved shape of the mounting segment 43 guides the control arm 40 to the pivot bearing 51 on the flap bearing 50 protruding into the furniture frame. The closed state defines the required length of the control arm 40. If the control arm 40 is too long or too short, the folding flap cannot be closed so as to completely contact the furniture frame. When using flap levers not adjustable in length as a connection between the flap holder 30 and the flap bearing 50, flap levers of a suitable length must be provided for items of furniture of different sizes. This is logistically complex and leads to malfunctions, for example if an incorrect flap lever is used. A control arm 40 adjustable in length can be used for adapting to the particular installation conditions.

FIG. 2 shows a perspective side view of the control arm 40. The second telescoping arm 42 comprises a rectangular cross section. The first telescoping arm 41 is implemented in the shape of a tube. Said arm has a rectangular inner cross section. A receptacle for the second telescoping arm 42 is thus implemented along the length thereof. The second telescoping arm 42 is inserted partially into the first telescoping arm 41 here. By pushing the second telescoping arm 42 into the first telescoping arm 41, or pulling the second telescoping arm 42 out of the first telescoping arm 41, the length of the control arm 40 can be adjusted. The two telescoping arms 41, 42 can be fixed to each other by means of a fixing screw 65. A grooved 42.1 is machined into the second telescoping arm 42. The groove 42.1 runs along the length of the control arm 40. Said groove is open toward the side of the fixing screw 65. At the end thereof, the second telescoping arm 42 implements the curved mounting segment 43. The mounting segment 43 is penetrated by an axial hole 43.1 at the end thereof. The axial hole 43.1 is aligned transverse to the length of the control arm 40. Said hole serves as part of the pivot bearing 51 of the articulated connection of the control arm 40 to the flap bearing 50 shown in FIG. 1.

FIG. 3 shows a plan view of a segment of the control arm 40. The second telescoping arm 42 is inserted partially into the first telescoping arm 41. The view allows seeing into the groove 42.1 of the second telescoping arm 42. The groove 42.1 is laterally bounded by groove side walls 42.3 spaced apart from each other. Opposite the opening of the groove 42.1, said groove is closed off by a groove floor 42.2. Detent receptacles 42.4 are formed in the groove floor 42.2 along the length of the second telescoping arm 42. The detent receptacles 42.4 are implemented as recesses in the groove floor 42.2. Here said grooves have a contour tilted relative to the groove floor 42.2 at the edge and running flat at the floor thereof. It is also conceivable, however, to provide other contours of the detent receptacles 42.4, for example in the form of a spherical segment. The detent receptacles 42.4 are each spaced apart from each other at a constant detent spacing 42.5. Each detent receptacle 42.4 is associated with a length indication of the control arm 40 in the form of a scale 42.6. The fixing screw 65 is guided through a locking hole 41.1 into the interior of the first telescoping arm 41. In the plan view, a screw head 65.2 having a tool receptacle 65.3 of the fixing screw 65 can be seen. The screw head 65.2 is disposed within the locking hole 41.1.

The mounting segment 43 has a tapering cross section relative to the segment of the second telescoping arm 42 receiving the groove 42.1.

FIG. 4 shows an exploded view of a segment of the control arm 40. A T-nut 60 is associated with the groove 42.1. The T-nut 60 is sized so as to be inserted and guided in the groove 42.1. A base part 60.1 of the T-nut 60 is rounded on the end thereof. The groove 42.1 is correspondingly rounded at the end thereof. The T-nut 60 can thus be displaced fully to the end of the groove 42.1. The T-nut 60 is penetrated by a pin guide 61 aligned transverse to the length of the groove 42.1. The pin guide 61 is a through hole open toward the groove 42.1 and on the opposite side. As can be seen particularly in FIG. 5, the pin guide 61 is expanded facing toward the groove 42.1 as a spring support 61.1. A spring 63 is associated with the spring support 61.1. The spring 63 is implemented as a compression spring. Said spring preloads a detent pin 62. The detent pin 62 comprises a cylindrical shaft 62.1. A pin head 62.2 is formed on the end of the shaft 62.1. The pin head 62.2 is oriented toward the groove 42.1, while the shaft 62.1 faces the spring 63 and the pin guide 61. The pin head 62.2 is implemented facing the groove 42.1 corresponding to the contour of the detent receptacles 42.4 shown in FIG. 3. The cross section of the shaft 62.1 of the detent pin 62 is adapted to the pin guide 61 of the T-nut 60. The shaft 62.1 can thus be inserted into the pin guide 61 and guided therein.

The T-nut 60 is further penetrated by a screw receptacle 64. The screw receptacle 64 is aligned corresponding to the pin guide 61. Said screw receptacle thus faces toward the groove 42.1. Facing away from the groove 42.1, the screw receptacle 64 is expanded into a screw head receptacle 64.1. The pin guide 61 and the screw receptacle 64 are spaced apart from each other corresponding to the detent spacing 42.5 (see FIG. 3) between the detent receptacles 42.4.

The fixing screw 65 is associated with the locking hole 41.1. The fixing screw 65 comprises a threaded segment 65.1 on which the screw head 65.2 having the tool receptacle 65.3 is formed. The threaded segment 65.1 is adapted to the screw receptacle 64 of the T-nut 60. The fixing screw 65 can be threaded through the locking hole 41.1 into the screw receptacle 64 of the T-nut 60, when said T-nut 60 is guided in the groove to the locking hole 41.1, such that the locking hole 41.1 is aligned with the screw receptacle 64.

FIG. 5 shows a partial section side view of the control arm 60. The section view relates to the transition region from the first to the second telescoping arm 41, 42. The second telescoping arm 42 is inserted as far as possible into the first telescoping arm 41 in the representation shown. The control arm 40 thus has the least possible length. The T-nut 60 is disposed in the groove 42.1 of the second telescoping arm 42. The T-nut 60 is thereby aligned relative to the first telescoping arm 41 such that the screw receptacle 64 is aligned with the locking hole 41.1. The fixing screw 65 is threaded into the screw receptacle 64. The screw head 65.2 of the fixing screw 65 is thereby partially received in the screw head receptacle 64.1 of the T-nut 60. The outer region of the screw head 65.2 protrudes into the locking hole 41.1 of the outer telescoping arm 41. The T-nut 60 is thereby retained at the first telescoping arm 41. The spring 63 is inserted into the spring support 61.1. The shaft 62.1 of the detent pin 62 is guided by the spring 63 to the pin guide 61 and radially retained therein. The spring 63 is under load between the pin head 62.2 and the transition segment between the spring support 61.1 and the pin guide 61 tapered for this purpose. The spring presses the pin head 62.2 of the detent pin 62 in the direction toward the groove floor 42.2 of the groove 42.1. The groove 62.1 is closed off by the first telescoping arm 41 opposite the groove floor 42.2 in the region of the T-nut 60. The spring force of the spring 63 transferred to the T-nut 60 is thus supported by the first telescoping arm 41.

In the position shown for the two telescoping arms 41, 42 relative to each other, the detent pin 62 is disposed opposite a detent receptacle 42.4 in the groove floor 42.2 of the groove 42.1. The pin head 42.2 is thereby pressed into the detent receptacle 42.4 by the acting spring force. The pin head 42.2 and the detent receptacle 42.4 thus form a detent connection due to the acting spring force. Said detent connection fixes the T-nut 60 relative to the second telescoping arm 42. At the same time, the T-nut 60 is connected to the first telescoping arm 41 by the fixing screw 65. An effective detent connection is thus produced between the two telescoping arms 41, 42. A sufficiently great force acting along the length of the control arm 40 between the two telescoping arms 41, 42 overcomes the spring force acting on the detent pin 62. The telescoping arms 41, 42 can thus be displaced linearly relative to each other and the length of the control arm 40 can thus be adjusted. When the next detent receptacle 42.4 is reached, the pin head 62.2 of the detent pin 62 is again pressed into said receptacle by the spring force. The change in length of the control arm 40 can thus be performed at a fixed raster defined by the detent spacing 42.5 between the detent receptacles 42.4. When the control arm 40 has the desired length, the T-nut 60 can be locked relative to the second telescoping arm 42 by the fixing screw 65. Because the same spacing is selected between the pin guide 61 and the screw receptacle 64 as the detent spacing 42.5 between the detent receptacles 42.4, when the detent pin 62 is engaged in a detent receptacle 42.4, the fixing screw 65 is disposed precisely opposite a further detent receptacle 42.4. The fixing screw 65 can then be threaded into the screw receptacle 64 of the T-nut 60 far enough that the end of the shaft thereof 62.1 protrudes out of the screw receptacle 64 and into the detent receptacle 42.4. In the present setting of the fixing screw 65, the T-nut 60 is thus fixed relative to the second telescoping arm 42. The screw head 65.2 of the fixing screw 65 is designed so as to at least partially protrude into the locking hole 41.1 of the first telescoping arm 41, even in the threaded-in position of the fixing screw 65. The T-nut 60 thereby remains fixed relative to the first telescoping arm 41 as well. The threaded-in fixing screw 65 thus locks the linear displacement of both telescoping arms 41, 42 relative to each other.

FIG. 6 shows a side section view of a segment of the control arm 40. The design and function of the telescoping arms 41, 42 and the fixing screw 65 corresponds to the description for FIGS. 1 through 5, to which reference is hereby made. The T-nut 60 further comprises a screw receptacle 64 into which the fixing screw 65 is threaded.

The function of the detent pin 62 is taken on by a detent protrusion 66 having a detent head 66.1. The detent protrusion 66 is implemented as a tab formed on the base part 60.1 of the T-nut 60. Said tab is aligned in the direction of the length of the control arm 40. The detent protrusion 66 thus runs spaced apart from the groove floor 42.2. The detent head 66.1 is formed on the free end of the detent protrusion 66.

Said head is aligned in the direction toward the groove floor 42.2. The shape of the detent head 66.1 is adapted to the contour of the detent receptacles 42.4. The detent protrusion 66 is elastic in design. The detent head 66.1 is thus pressed against the groove floor 42.2 by the detent protrusion 66. When the detent head 66.1 is disposed opposite a detent receptacle 42.4, the head is pressed into the detent receptacle 42.4 by the spring-loaded effect of the detent protrusion 66. A detent connection is thereby produced between the T-nut 60 and the detent receptacle 42.4 and thus the second telescoping arm 42. The partially threaded-in fixing screw 65 does not engage in one of the detent receptacles 42.4 and connects the T-nut 60 to the first telescoping arm 41 as described for FIG. 5. An effective detent connection is thus implemented between the two telescoping arms 41, 42. The detent head 66.1 is spaced apart from the fixing screw 65 corresponding to the detent spacing 42.5 between the detent receptacles 42.4. When the detent head 66.1 is engaged in a detent receptacle 42.4, the fixing screw 65 is thus disposed opposite a detent receptacle 42.4. By threading in the fixing screw 65, said screw can engage with the detent receptacles 42.4. The T-nut 60, as previously described for FIG. 5, is thus fixed to the second telescoping arm 42. A linear displacement of the two telescoping arms 41, 42 relative to each other is thus no longer possible. The length of the control arm 40 is thus fixed. It is also conceivable to guide the fixing screw 65 through the T-nut 60 toward the detent head 66.1. A fixing screw 65 thus disposed can then be threaded in to bear against the side of the detent protrusion facing away from the detent receptacle 42.4 and lock the same. Releasing of the detent connection is thereby prevented and the telescoping arms 41, 42 are mutually fixed. By threading out a fixing screw 65 thus disposed, the detent protrusion 66 is again released and the detent head 66.1 can slip out of the detent receptacle 42.4 when corresponding force is applied.

If the detent connection is implemented by a detent protrusion 66 of the T-nut 60, the detent protrusion 66 formed thereon is preferably made of an elastic material, particularly of a metal or a plastic.

FIG. 7 shows a side section view of the item of furniture 10 shown in FIG. 1 having the folding flap joined by a hinge, the lifting device, and the control arm 40. The section is thereby placed through the control arm 40.

The control arm 40 is implemented according to the description for FIGS. 1 through 6, wherein a T-nut 60 having a detent pin 62 is used, as shown in FIGS. 4 and 5.

The first telescoping arm 41 comprises an attachment region 41.3 at the end thereof facing toward the item of furniture 10, by means of which said arm is placed on the mounting protrusion 33.1 of the lever 33 of the flap holder 30. The mounting protrusion 33.1 preferably comprises a stop, not shown, against which the fully placed first telescoping arm 41 bears. Such a stop ensures the correct positioning of the control arm 40 relative to the mounting protrusion 33.1. In said position, a threaded hole made in the mounting protrusion 33.1 is aligned with a fixing hole 41.4 on the first telescoping arm 41. The threaded hole 33.2 is expanded into a head receptacle 33.3 toward the fixing hole 41.4. A threaded segment 35.1 of the fixing screw 35 is threaded into the threaded hole 33.2 such that the screw head thereof is disposed at least partially in the head receptacle 33.3. The screw head of the fixing screw 35 comprises a stop ring 35.2 transitioning into a fixing segment 35.3 opposite the threaded segment 35.1. The fixing segment 35.3 comprises a reduced diameter in comparison with the stop ring 35.2. A tool engagement 35.4 is formed in the fixing segment

35.3 and in the region of the stop ring 35.2. The diameter of the fixing segment 35.3 is slightly smaller than the diameter of the fixing hole 41.4 on the telescoping arm 41, while the diameter of the stop ring 35.2 is greater than the diameter of the fixing hole 41.4. For attaching the control arm to the mounting protrusion 33.1, the fixing screw 35 is first threaded into the threaded hole 33.2 far enough that the head of the fixing screw 35 is fully received by the head receptacle 33.3 formed in the mounting protrusion 33.1. The head of the fixing screw thus no longer protrudes above the mounting protrusion 33.1 and the first telescoping arm 41 can be placed onto the mounting protrusion 33.1, preferably against stop. In the present installed position, the fixing hole 41.4 is aligned with the fixing segment 35.3 of the fixing screw 35. As shown in more detail in FIG. 8, a tool 70 can now be guided through the fixing hole 41.4 to the tool engagement 35.4 of the fixing screw 35 and said screw can be partially threaded out from the threaded hole 33.2 until the stop ring 35.2 bears all around against the fixing hole 41.4 on the first telescoping arm 41, and the fixing segment 35.3 of the fixing screw 35 engages with the locking hole 41.1. The control arm 40 is thus fixed to the mounting protrusion 33.1 of the lever 33 and can no longer be pulled off.

An actuating space 41.2 is implemented between the mounting protrusion 33.1 and the end of the second control arm 42 in the first telescoping arm 41 and increases or decreases as the telescoping arms 41, 42 are displaced relative to each other. The actuating space 41.2 is designed such that when the second telescoping arm 42 is fully inserted, said arm does not bear against the mounting protrusion 33.1

The lever 33 is pivotably supported on the pivot axis 33.4 of the flap holder 30 by means of an attaching segment 33.5. A coupling piece 34 is hinged to the lever 33, by means of which the force of one or more springs, not shown, provided in the flap holder 30 is transferred to the lever 33 and thus to the control arm 40. Said spring force supports the opening and closing motion of the folding flap, as previously described, and holds the same in partially opened positions.

The control arm 40 is connected opposite the flap holder 30 to the flap bearing 50 disposed on the folding flap. The flap bearing 50 comprises an installation support 53 screwed to the inner side of the second partial flap 19 by means of installation screws 54. A bearing part 52 is linearly displaceably connected to the installation support 53. The displacement path thereby runs along the plane of the second partial flap 19 and the project of the control arm 40 onto the second partial flap 19. The correct position of the bearing part 52 and the pivot bearing 51 connected thereto can be adjusted and locked by means of an adjusting screw.

When installing the lifting device, the length of the control arm 40 is first adapted to the size of the present item of furniture 10 and the hinged folding flap. The length can thereby be read from the scale 42.6 shown in FIG. 3. The length is adjusted according to the detent specifications by the detent connection between the two telescoping arms 41, 42. The detent spacing 42.5 between the detent receptacles 42.4 is at a whole-number ratio to the hole spacing 17 between the front wall holes 16.1. The hole spacing 17 of the wall holes 16.1, 16.2 is thereby largely standardized and is typically 32 mm. The detent spacing 42.5 of the detent connection of the control arm 40 is defined here as 8 mm. When the item of furniture 10 is closed, the telescoping arm 41, 42 is aligned according to the series of front wall holes 16.1. The whole-number ratio of the detent spacing 42.5 between the detent receptacles 42.4 to the hole spacing 17 of the wall holes means that the length of the control arm 40 can be set to the required length despite the rastered, non-continuous adjustment of the length. The required length, as previously described, is thereby defined by the installed position of the flap holder 30 and the flap bearing 50 when the item of furniture 10 is closed. When the length of the control arm 40 is adjusted correctly, the two telescoping arms 41, 42 are fixed to each other by the fixing screw 65. Small deviations of the length of the control arm 40 from the precise required length can be compensated for by corresponding linear displacement of the location of the pivot bearing 51. This is done by correspondingly displacing the bearing part 52 relative to the installation support 53. The correct length of the control arm 40 and the position of the pivot bearing 51 is achieved when the folding flap makes full contact with the furniture frame when the item of furniture 10 is closed, and the two partial flap 18, 19 are aligned to each other in one plane. The displacement range of the flap bearing 50 advantageously corresponds to at least the length of one detent spacing 42.5. Any deviation of the length of the control arm 40 from the required length of less than one detent spacing 42.5 can thereby be compensated for by correspondingly positioning the pivot bearing 51. Greater deviations can be compensated for by adapting the length of the control arm.

Simple adjustment of the length of the control arm 40 can be done in that the lifting device, to which the folding flap has previously been mounted and aligned, is first installed on the item of furniture 10. The folding flap is then closed while the linear displacement of the flap bearing 50 is locked and the fixing screw 65 of the control arm 40 is released. The closed state of the item of furniture 10 defines the precise required length of the control arm 40. When the folding flap is closed, the telescoping arms 41, 42 thus displace such that the control arm 40 takes on the required length according to the detent spacing 42.5. The retaining force of the detent connection between the telescoping arms 41, 42 is selected such that when the folding flap is then opened, the length of the control arm 40 does not change. The length of the control arm 40 can now be easily fixed while the folding flap is open and thus the fixing screw 65 is accessible. Fine adjustment of the closing position of the folding flap is then made by adjusting the flap bearing 50 accordingly.

FIG. 8 shows a side section view of a segment of the control arm 40. As previously described, the fixing screw 35 can be threaded out by engaging a suitable tool so that the fixing segment 35.3 thereof is guided in the fixing hole 41.4, whereby the first telescoping arm 41 is fixed relative to the mounting protrusion 33.1.

The invention claimed is:

1. A control arm for joining a flap holder to a flap of an item of furniture in an articulated manner, the control arm comprising:

a first telescoping arm;

a second telescoping arm displaceably guided on the first telescoping arm for adjusting a length of the control arm;

a fixing device configured to fix a position of the first and second telescoping arms relative to each other; and a detent connection between the first and second telescoping arms, the detent connection including at least two detent settings disposed along the length of the control arm and spaced apart by a detent spacing;

wherein:

the detent connection includes a plurality of detent receptacles disposed on one of the first and second telescoping arms;

the detent connection includes a spring-loaded detent element configured to engage the detent receptacles; and the fixing device includes a locking element engaging with one of the detent receptacles in a first operating position and disengaging from the one detent receptacle in a second operating position, the one detent receptacle engaged by the locking element being separate from one of the detent receptacles engaged by the spring-loaded detent element.

2. The control arm of claim 1, wherein:

successive detent settings are each disposed at the same detent spacing from each other.

3. The control arm of claim 2, wherein:

the detent spacing has a whole-number ratio to a spacing of potential installed positions of the flap holder on the item of furniture.

4. The control arm of claim 2, wherein:

the detent spacing is 8 mm.

5. The control arm of claim 1, wherein:

the fixing device is configured to lock the detent element in one of the detent receptacles.

6. The control arm of claim 1, wherein:

the locking element produces a locking connection to the other of the first and second telescoping arms in both operating positions.

7. The control arm of claim 1, wherein:

the locking element is spaced from the detent element by the detent spacing or by a whole-number multiple of the detent spacing.

8. The control arm of claim 1, wherein:

the first telescoping arm is an outer telescoping arm and the second telescoping arm is an inner telescoping arm received in the outer telescoping arm; and the detent receptacles are disposed on the inner telescoping arm.

9. The control arm of claim 8, wherein:

the inner telescoping arm includes a groove extending in a longitudinal direction, and the detent receptacles are disposed on a floor of the groove.

10. The control arm of claim 8, wherein:

the inner telescoping arm includes a groove extending in a longitudinal direction, at least one of the detent connection and the fixing device being disposed at least partially in the groove.

11. The control arm of claim 1, wherein:

the first telescoping arm includes an attachment region at an end of the first telescoping arm facing away from the second telescoping arm, the attachment region being configured to be placed over a mounting protrusion of a pivotably supported lever of the flap holder.

12. A control arm for joining a flap holder to a flap of an item of furniture in an articulated manner, the control arm comprising:

a first telescoping arm;

a second telescoping arm displaceably guided on the first telescoping arm for adjusting a length of the control arm;

a fixing device configured to fix a position of the first and second telescoping arms relative to each other; and a detent connection between the first and second telescoping arms, the detent connection including at least two detent settings disposed along the length of the control arm and spaced apart by a detent spacing;

wherein:

the detent connection includes a plurality of detent receptacles disposed on one of the first and second telescoping arms;

the detent connection includes a spring-loaded detent element configured to engage the detent receptacles;

the second telescoping arm includes a groove extending in a longitudinal direction, at least one of the detent connection and the fixing device being disposed at least partially in the groove;

the fixing device includes a locking element engaging with one of the detent receptacles in a first operating position and disengaging from the one detent receptacle in a second operating position; and a T-nut is guided in the groove, at least one of the detent element and the locking element being disposed on the T-nut.

13. The control arm of claim 12, wherein:

the detent element includes a spring-loaded detent pin linearly displaceably guided in a pin guide on the T-nut.

14. The control arm of claim 12, wherein:

the detent element includes an elastic spring detent protrusion including a detent head, the elastic spring detent protrusion being integrally formed with the T-nut.

15. The control arm of claim 12, wherein:

the locking element of the fixing device includes a locking screw threaded into the T-nut and including a screw end engaging with one of the detent receptacles at a first operating thread-in depth and disengaging from the detent receptacle at a second operating thread-in depth.

16. The control arm of claim 15, wherein:

the locking screw includes a screw head accessible at both operating thread-in depths from outside the control arm through a locking hole defined in the first telescoping arm.

17. The control arm of claim 16, wherein:

the T-nut includes a screw receptacle implemented as a through hole, the locking screw being threaded into the screw receptacle, the screw receptacle including an enlarged region configured to receive the screw head.

* * * * *